F. BARTER.
TOOL HOLDER AND EJECTOR.
APPLICATION FILED JUNE 10, 1910.
1,040,258.
Patented Oct. 8, 1912.
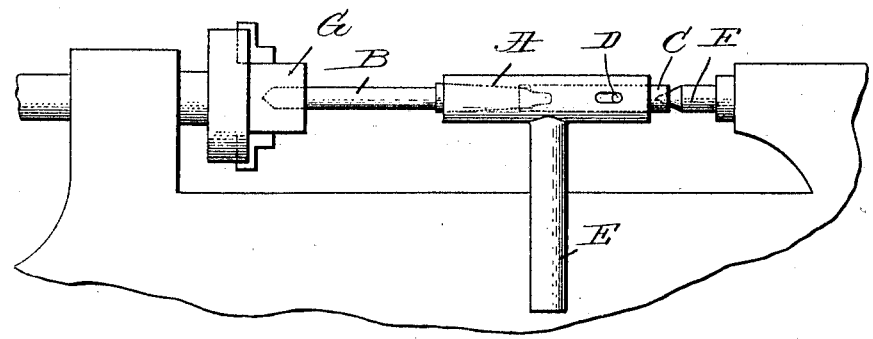
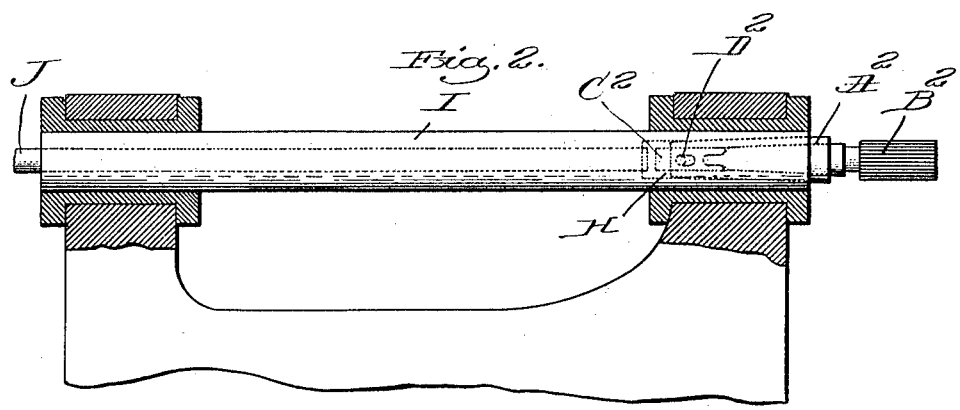
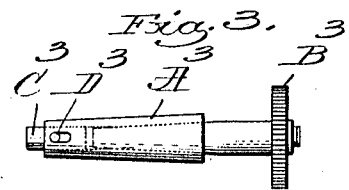
Witnesses:
Fred S. Grunbaf.
Joseph M. Ward.
Inventor,
Frank Barter,

UNITED STATES PATENT OFFICE.

FRANK BARTER, OF FITCHBURG, MASSACHUSETTS.

TOOL HOLDER AND EJECTOR.

1,040,258.     Specification of Letters Patent.     Patented Oct. 8, 1912.

Application filed June 10, 1910. Serial No. 566,155.

*To all whom it may concern:*

Be it known that I, FRANK BARTER, a citizen of the United States, and resident of Fitchburg, county of Worcester, State of Massachusetts, have invented an Improvement in Tool Holders and Ejectors, of which the following description, in connection with the accompanying drawing, is a specification, like characters on the drawing representing like parts.

This invention relates to a device for holding a tool, such a drill, reamer, or other implement, provided with means for securing the ready ejection of the tool when desired.

The invention may take somewhat different forms, and the same principle is involved whether the device holding the tool revolves with the tool to operate upon a stationary piece of work, or is stationary with the tool to operate upon a rotating piece of work.

The invention will more fully appear from the accompanying description and drawings and will be particularly pointed out in the claim.

The drawings show preferred forms of the invention as applied to different uses.

In the drawings, Figure 1 is a side elevation of a portion of an ordinary lathe with a device embodying the present invention illustrated in connection therewith to hold a stationary drill in its operation upon a rotating piece of work; Fig. 2 is a side elevation, partially in cross section, of the head stock of a lathe, or milling machine, with a device embodying the present invention illustrated in connection therewith for holding a rotating tool to operate upon a stationary piece of work. Fig. 3 is a similar view of a device embodying the present invention for holding an emery wheel, adapted for use in connection with a machine such as shown in Fig. 2.

The device comprises a body portion which is best described as an axially-apertured sleeve shown in Fig. 1 at A; in Fig. 2 at $A^2$; and in Fig. 3 at $A^3$. At the tool receiving end the aperture in the sleeve tapers inwardly from the end, thus adapting it to receive and hold firmly and tightly by friction the correspondingly tapered shank of the tool.

In Fig. 1 the tool is shown as a drill B having a tapered shank; in Fig. 2, as a milling cutter $B^2$ having a tapered shank; and in Fig. 3 as an emery wheel $B^3$ having a tapered shank. The opposite end of the aperture in the sleeve is preferably cylindrical and is provided with an ejector pin, shown in Fig. 1 at C; in Fig. 2 at $C^2$; and in Fig. 3 at $C^3$, mounted to slide in the sleeve and projecting slightly beyond the end of the sleeve. This ejector pin is so connected to the sleeve as to have a free, limited, longitudinal movement relatively to the sleeve, and for that purpose a small pin, shown at D in Fig. 1; at $D^2$ in Fig. 2; and at $D^3$ in Fig. 3, projects transversely through the ejector pin and slides longitudinally in slots in the sleeve by which the longitudinal movement of the ejector pin is limited. The ejector pin at its inward end within the sleeve may be flat as shown in Fig. 3, or it may be of a shape complemental to that of the adjacent end of the tool, as shown in Figs. 1 and 2.

In Fig. 1 the sleeve A is provided with a handle E, and the ejector pin C is provided at its protruding end with a centering depression. When in use the drill or other tool B is pressed into the tapering end of the aperture of the sleeve and is thus held firmly in place therein by friction, the tool when pressed in, pushing back the ejector pin. The device is then held with the ejector pin fitting over the lathe center F and with the drill up against the material or stock G to be operated upon. When it is desired to remove the drill or tool, pressure on the end of the ejector pin, as by a slight tap, at once quickly and readily forces the tool out, and without any injury to the shank of the tool.

In Fig. 2, the sleeve $A^2$ is shown as exteriorly tapered to fit in a correspondingly tapered recess H formed in the end of a hollow rotating shaft I in the milling machine. A rod J extends through the hollow shaft into the aperture H. When in operation, the tool, such as milling cutter $B^2$ having a tapered shank, is fitted into the tapering end of the aperture in the sleeve $A^2$ and firmly held therein by friction; the sleeve $A^2$ is itself then fitted in the tapering aperture in the end of the shaft I and upon rotation of the shaft I the milling cutter is revolved. When it is desired to remove the tool pressure on the end of the ejector pin, as by means of a tap on the end of the rod J, forces out the tool in a similar manner as already described.

In Fig. 3, a construction is shown for supporting an emery wheel B³ having a tapering shank in the tapering end of the aperture in the sleeve A³. In this case the sleeve A³ is itself tapered so that it may be employed in a machine such as shown in Fig. 2.

In all forms of the device it will be noted that the axial aperture extends entirely through the body portion from end to end, thus enabling the ejector pin to be struck squarely on its end and in line with its axis when it is desired to eject the tool.

Having thus fully described my invention what I claim as new and desire to secure by Letters Patent is:

A tool holder and ejector comprising a body portion axially apertured throughout its length to form a sleeve, the aperture being tapered inwardly from one end to receive and hold a tapered tool shank, and an ejector pin mounted to slide in the opposite end of the aperture and projecting beyond the sleeve and provided with a centering depression in said projecting end whereby the tool may be held against rotation with respect to the sleeve, may be readily ejected therefrom by longitudinal pressure on the end of the ejector pin, and may be readily used in a lathe.

In testimony whereof, I have signed my name to this specification, in the presence of two subscribing witnesses.

FRANK BARTER.

Witnesses:
 FANNIE E. TENNEY,
 HARRISON BAILEY.

---

Copies of this patent may be obtained for five cents each, by addressing the "Commissioner of Patents, Washington, D. C."